United States Patent [19]

Smith

[11] Patent Number: 4,654,891
[45] Date of Patent: Mar. 31, 1987

[54] OPTICAL COMMUNICATION OF VIDEO INFORMATION WITH DISTORTION CORRECTION

[76] Inventor: Clyde Smith, 42 Beaumont Dr., Melville, N.Y. 11747

[21] Appl. No.: 775,179

[22] Filed: Sep. 12, 1985

[51] Int. Cl.⁴ .................................................. H04B 9/00
[52] U.S. Cl. ................................. 455/617; 455/618; 455/613; 372/33
[58] Field of Search ............... 358/174, 178; 455/619, 455/618, 617, 613, 612; 372/31, 32, 33, 38

[56] References Cited

U.S. PATENT DOCUMENTS 4,009,385 2/1977 Sell .................................. 455/618 X
4,114,180 9/1978 Kayanuma ....................... 372/33 X

FOREIGN PATENT DOCUMENTS 0222630 12/1983 Japan .................................. 455/618

OTHER PUBLICATIONS

"Optical Fiber Communications for Broadcasting Applications" Ueno et al., Intelcon Conference, Feb. 26—Mar. 2, 1979.

Primary Examiner—Howard W. Britton
Assistant Examiner—Victor R. Kostak
Attorney, Agent, or Firm—Martin Novack

[57] ABSTRACT

A predistortion circuit is disclosed for correcting distortions in an optical communication system caused by the characteristics of a light-emitting diode. The invention makes use of the existence of automatic gain control circuitry in the receiver portion of an optical communication system to assist in correction of distortions which occur at the transmitter end. In particular, the present invention provides passive pre-distortion circuitry in the transmitter which dynamically modifies the level with respect to which the video signal in the transmitter is clamped. The automatic gain control circuit in the receiver will detect the DC level of the received video. A shift in the DC reference level transmitted causes the receiver AGC to correct the receiver gain. Since the invention operates to appropriately adjust the clamping reference at the transmitter end in a manner which compensates for distortions introduced by the light-emitting diode, the gain correction at the receiver will be responsive to this change in clamping level and therefore tend to correct for the distortions.

18 Claims, 1 Drawing Figure

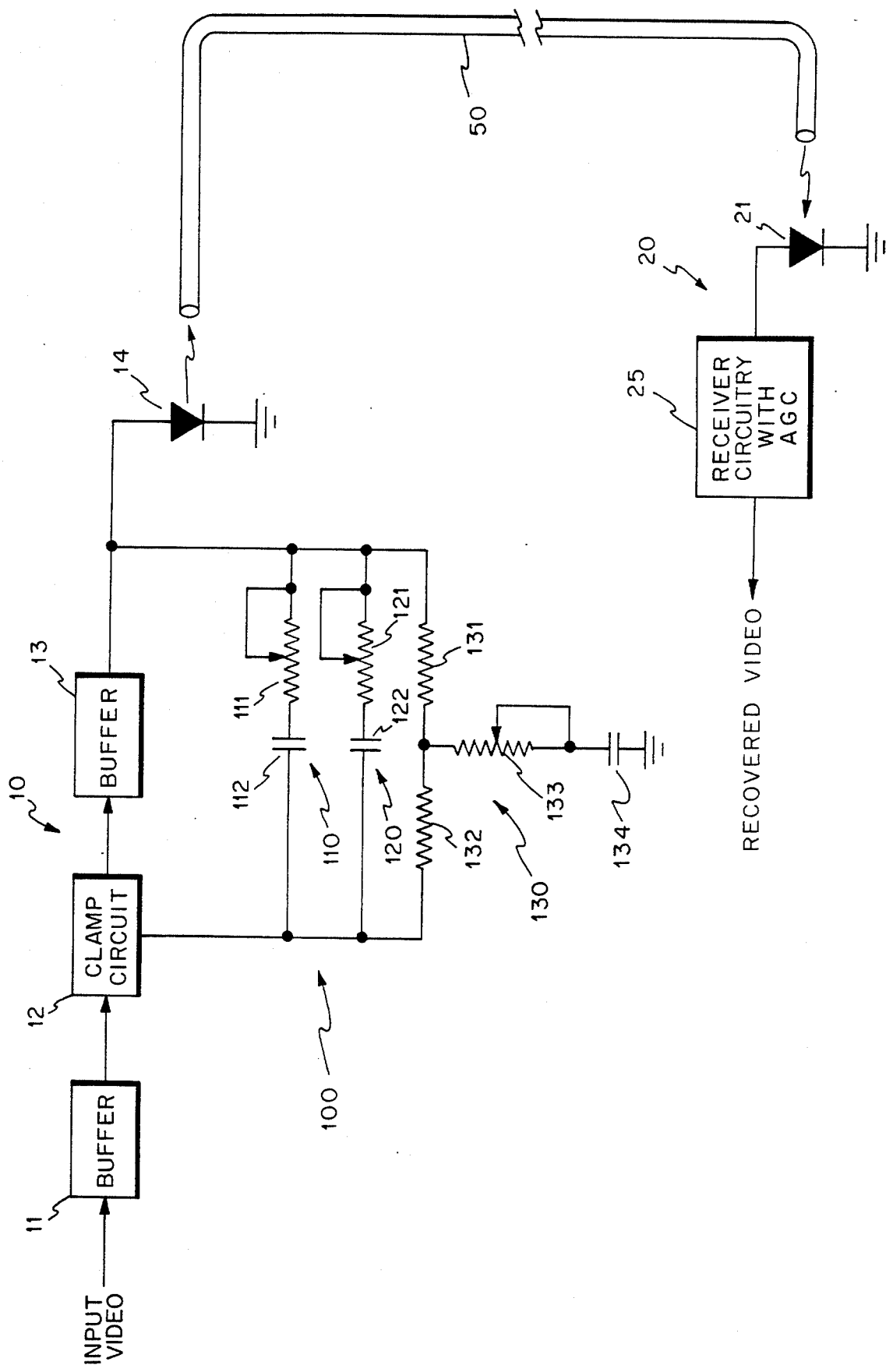

OPTICAL COMMUNICATION OF VIDEO INFORMATION WITH DISTORTION CORRECTION

BACKGROUND OF THE INVENTION

This invention relates to improvements in communications systems and, more particularly, to a distortion correction apparatus with application to an optical communication system in which video information is transmitted over an optical link to a receiver.

In a common type of television communication over an optical communication system, such as one employing a fiber optical link, an amplitude-modulated television video signal is utilized to drive a light-emitting diode. The light emitted from the diode, which contains the video information, is carried over the optical link and then recovered at a receiver.

In present and forseeable state of the art, a light-emitting diode is a necessary important component of the transmitter in an optical communication system such as a fiber optics communication system. Light-emitting diodes, however, have been found to introduce troublesome distortions to signals applied thereto. When a video signal is applied to a light-emitting diode in the transmitter of an optical transmission system, these distortions result in degradation of the video when it is recovered at the receiver end of the optical communications system. Distortions introduced by light-emitting diodes involve, inter alia, the following phenomena: The output of a light-emitting diode is temperature sensitive. The light-emitting diode junction temperature changes with video content as the current through the diode causes it to heat up. Therefore, the light output changes with picture brightness or "A.P.L", which stands for "average picture level". In a television video signal the sync tip time has a different A.P.L than the picture, so the sync tip is also distorted. The vertical sync tip may be substantially distorted, but the horizontal sync tip is generally not distorted noticeably, since the heating time constant of the light-emitting diode junction is longer than the horizontal sync time.

The described types of distortions generally decrease light output with increasing temperature. Accordingly, one might normally assume that such distortions could not be readily corrected for by using a passive circuit which does not provide gain in the correction.

It is an object of the present invention to correct for distortions caused by light-emitting diodes in the described type of optical communication system, and to do so with circuitry that is not unduly complex and expensive, and which can be passive.

SUMMARY OF THE INVENTION

The present invention makes use, inter alia, of the existence of automatic gain control circuitry in the receiver portion of an optical communication system to assist in correction of distortions which occur at the transmitter end. In particular, the present invention provides passive pre-distortion circuitry in the transmitter which dynamically modifies the level with respect to which the video signal in the transmitter is clamped. The automatic gain control circuit in the receiver will detect the DC level of the received video. A shift in the DC reference level transmitted causes the receiver AGC to correct the receiver gain. Since the invention operates to appropriately adjust the clamping reference at the transmitter end in a manner which compensates for distortions introduced by the light-emitting diode, the gain correction at the receiver will be responsive to this change in clamping level and therefore tend to correct for the distortions, in the manner to be described.

In the preferred embodiment of the invention a pre-distortion circuit is coupled to the output of said clamp circuit for feeding back a portion of the video signal to the clamp circuit to dynamically change the DC clamping reference level of the clamp circuit. The predistortion circuit has an operator-adjustable characteristic, such as time constant and feedback level, which can be adjusted to compensate for distortions caused by the characteristics of said light-emitting diode. In the embodiment set forth the predistortion circuit includes three feedback circuits in parallel, each correcting for a different component or type of distortion.

Further features and advantages of the invention will become more readily apparent from the following detailed description when taken in conjunction with the accompanying drawing.

BRIEF DESCRIPTION OF THE DRAWING

The drawing shows an embodiment of the invention, in schematic and partial block form, for optical communication of video information with distortion correction.

DESCRIPTION OF THE PREFERRED EMBODIMENT

Referring to the Drawing, there is shown a diagram, partially in block form, of an optical communications system which includes an embodiment of the invention. The reference numeral 10 represents a portion of a transmitter system (other portions of which, not shown, may be of known form) which receives an input video signal to be transmitted. The input video signal, in an AC-coupled state, is coupled, via a first buffer circuit 11, to a clamp circuit 12, which may be of known form. The output of the clamp circuit 12 is coupled, via a second buffer circuit 13, to a light-emitting diode 14. Light from diode 14 is transmitted over optical link 50, for example a fiber optical link, and received at receiver 20, which is shown as including a photodiode 21, and receiver circuitry 25, which includes an AGC capability. Again, details of the receiver, which may be of known form, are not set forth.

In addition to its input which receives the video signal, the clamp circuit 12 in the transmitter 10 conventionally has an input for receiving a reference level, with respect to which the clamp circuit operates to clamp the video signal. In the present embodiment, three predistortion circuits, in parallel, are employed, and feed back the output signal from clamp circuit 12, via buffer 13, to the reference input of clamp circuit 12. The circuit 110 includes, in series, adjustable resistor 111 and capacitor 112. Typical values for resistor 111 and capacitor 112 are 10k ohms and 1 microfarad, respectively. The circuit 120 includes, in series, an adjustable resistor 121 and a capacitor 122, with typical values being 100K ohms and 0.0033 microfarads, respectively. The circuit 130 includes a voltage divider including resistors 131 and 132 (typical values, 470 ohms), and a series arrangement of adjustable resistor 133 and capacitor 134 (typical values, 10K ohms and 22 microfarads) coupled from between the voltage divider and ground reference potential.

Each of the circuits 110, 120 and 130, in the circuit 100, provides a controlled distortion in the feedback signal which results in a "predistortion" in the video signal which, in turn, tends to correct for a distortion that is introduced as a consequence of the operating characteristics of light-emitting diode 14. The time constants and feedback levels of the circuits can be adjusted. The circuit 120 has the fastest time constant, and is utilized as a sync tip null. The vertical sync tip, which is normally affected by moderately short-term streaking, is found to be substantially improved using this circuit. The circuit 110, which has a longer time constant, corrects for long-term streaking, which is similar to "tilt" in conventional television transmission. The circuit 130, which has the longest time constant, is a dynamic gain correction predistortion circuit. In this circuit the capacitor 134 serves to integrate and average the feedback signal over a period of time. In each case, changes are introduced in the clamping reference level which, as described above, result in appropriate AGC corrections at the receiver which tend to correct for distortions introduced by the operating characteristics of light-emitting diode 14. The adjustable resistors can be adjusted until observed distortions in the video are minimized.

The invention has been described with reference to a particular preferred embodiment, but variations within the spirit and scope of the invention will occur to those skilled in the art. For example, the component values set forth are exemplary, and other combinations can be utilized.

I claim:

1. In an optical communication transmitter wherein a video signal is clamped, by a clamp circuit, with respect to a DC reference level and then coupled to a light-emitting diode, the light output of which is coupled over an optical link to a receiver having automatic gain control, the improvement comprising:
    a predistortion circuit coupled to the output of said clamp circuit for feeding back a portion of the video signal to said clamp circuit to dynamically change the DC clamping reference level of said clamp circuit, said predistortion circuit having an operator-adjustable time constant, whereby said time constant can be adjusted to compensate for distortions caused by the characteristics of said light-emitting diode.

2. The transmitter as defined by claim 1, wherein said predistortion circuit also has an operator-adjustable feedback level.

3. The transmitter as defined by claim 1, wherein said predistortion circuit comprises an adjustable resistor and a capacitor coupled in series.

4. The transmitter as defined by claim 1, wherein said predistortion circuit comprises an adjustable resistor and a capacitor coupled to ground reference potential.

5. The transmitter as defined by claim 4, wherein said predistortion circuit further comprises a voltage divider and wherein said adjustable resistor and said capacitor are coupled in series arrangement from between said voltage divider to ground reference potential.

6. The transmitter as defined by claim 1, wherein said predistortion circuit includes a parallel arrangement of:
    a first adjustable resistor and a first capacitor coupled in series; and
    a voltage divider, and a second adjustable resistor and second capacitor coupled in series arrangement from between said voltage divider to ground reference potential.

7. The transmitter as defined by claim 6, wherein said first adjustable resistor and first capacitor have a smaller time constant than said second adjustable resistor and second capacitor.

8. The transmitter as defined by claim 6, wherein said predistortion circuit further comprises a series arrangement including a third adjustable resistor and a third capacitor, said series arrangement being coupled in parallel with the other portions of the predistortion circuit.

9. The transmitter as defined by claim 8, wherein the time constant of said third adjustable resistor and third capacitor is larger than the time constant of said first adjustable resistor and first capacitor, and smaller than the time constant of said second adjustable resistor and second capacitor.

10. An optical communication system for communicating a television video signal, comprising:
    a transmitter, including a clamp circuit for clamping said video signal with respect to a DC reference level, the output of said clamp circuit being coupled to a light-emitting diode;
    a predistortion circuit coupled to the output of said clamp circuit for feeding back a portion of the video signal to said clamp circuit to dynamically change the DC clamping reference level of said clamp circuit, said predistortion circuit having an operator-adjustable time constant;
    an optical link for carrying light from said light-emitting diode;
    a receiver including photodetection means for receiving light from said optical link and converting said light to an electrical signal; and
    receiver circuitry, including automatic gain control means, for recovering said television signal from the output of said photodetection means;
    whereby said time constant of said predistortion circuit can be adjusted to compensate for distortions caused by the characteristics of said light-emitting diode.

11. The system as defined by claim 10, wherein said predistortion circuit also has an operator-adjustable feedback level.

12. The system as defined by claim 10, wherein said predistortion circuit comprises an adjustable resistor and a capacitor coupled in series.

13. The system as defined by claim 10, wherein said predistortion circuit comprises an adjustable resistor and a capacitor coupled to ground reference potential.

14. The system as defined by claim 13, wherein said predistortion circuit further comprises a voltage divider and wherein said adjustable resistor and said capacitor are coupled in series arrangement from between said voltage divider to ground reference potential.

15. The system as defined by claim 10, wherein said predistortion circuit includes a parallel arrangement of:
    a first adjustable resistor and a first capacitor coupled in series; and
    a voltage divider, and a second adjustable resistor and second capacitor coupled in series arrangement from between said voltage divider to ground reference potential.

16. The system as defined by claim 15, wherein said first adjustable resistor and first capacitor have a smaller time constant than said second adjustable resistor and second capacitor.

17. The system as defined by claim 15, wherein said predistortion circuit further comprises a series arrangement including a third adjustable resistor and a third capacitor, said series arrangement being coupled in parallel with the other portions of the predistortion circuit.

18. The system as defined by claim 17, wherein the time constant of said third adjustable resistor and third capacitor is larger than the time constant of said first adjustable resistor and first capacitor, and smaller than the time constant of said second adjustable resistor and second capacitor.

* * * * *